United States Patent [19]
DeFlorio

[11] Patent Number: 5,541,778
[45] Date of Patent: Jul. 30, 1996

[54] ROTATIONAL SAFETY MIRROR INSTALLATION FOR VEHICLE CONNECTED IN TANDEM

[76] Inventor: Ralph E. DeFlorio, P.O. Box 301, 202 Water St., Hillsboro, Ind. 47949

[21] Appl. No.: 136,419

[22] Filed: Oct. 15, 1993

[51] Int. Cl.⁶ .............................. G02B 7/182; B60R 1/06
[52] U.S. Cl. .............................. 359/843; 359/872
[58] Field of Search .................... 359/843, 844, 359/872, 873, 877

[56] References Cited

U.S. PATENT DOCUMENTS

| | | | |
|---|---|---|---|
| 3,469,901 | 9/1969 | Cook et al. | 359/843 |
| 3,640,609 | 2/1972 | McKee et al. | 359/843 |
| 3,749,480 | 7/1973 | DeWitt et al. | 359/843 |
| 3,950,080 | 4/1976 | McKee et al. | 359/843 |
| 4,609,265 | 9/1986 | McKee et al. | 359/843 |
| 4,938,577 | 7/1990 | Sugita | 359/843 |
| 5,132,851 | 7/1992 | Bomar et al. | 359/843 |

FOREIGN PATENT DOCUMENTS

| | | | |
|---|---|---|---|
| 0094817 | 11/1983 | European Pat. Off. | 359/843 |
| 2601634 | 1/1988 | France | 359/843 |
| 0004243 | 1/1980 | Japan | 359/843 |
| 0236849 | 11/1985 | Japan | 359/843 |
| 8605451 | 9/1986 | WIPO | 359/843 |

*Primary Examiner*—Ricky D. Shafer

[57] ABSTRACT

A special rear vision mirror device and installation which provides and utilizes a continual safety monitoring of the angular relationship between the pivotally-connected tractor and trailer vehicle units of a "semi" (tractor/trailer tandem-connected vehicles). The overall mirror installation, during a semi's turning maneuver, automatically rotates the mirror in a special relation and correspondence to what at each increment of the turn is the angular relation of the tractor and trailer, particularly the angular changes from a straight (in line) tandem vehicle relation, occurring while the semi is in the turning maneuver. This provides, continuously, a controlled, and as needed, continuously-adjusted safety setting for the mirror, such that the driver's safety-needed vision of the trailer's rear portion and rear wheels is viewable through the mirror; thus the driver's vision during a turn is permitted and provided by the mirror to be that of maximal safety. The mirror's controlled rotation is provided to be one-half the angle which is a special and changing-value function of the amount of rotational swing of the trailer in the turn at any portion of the turn.

1 Claim, 9 Drawing Sheets

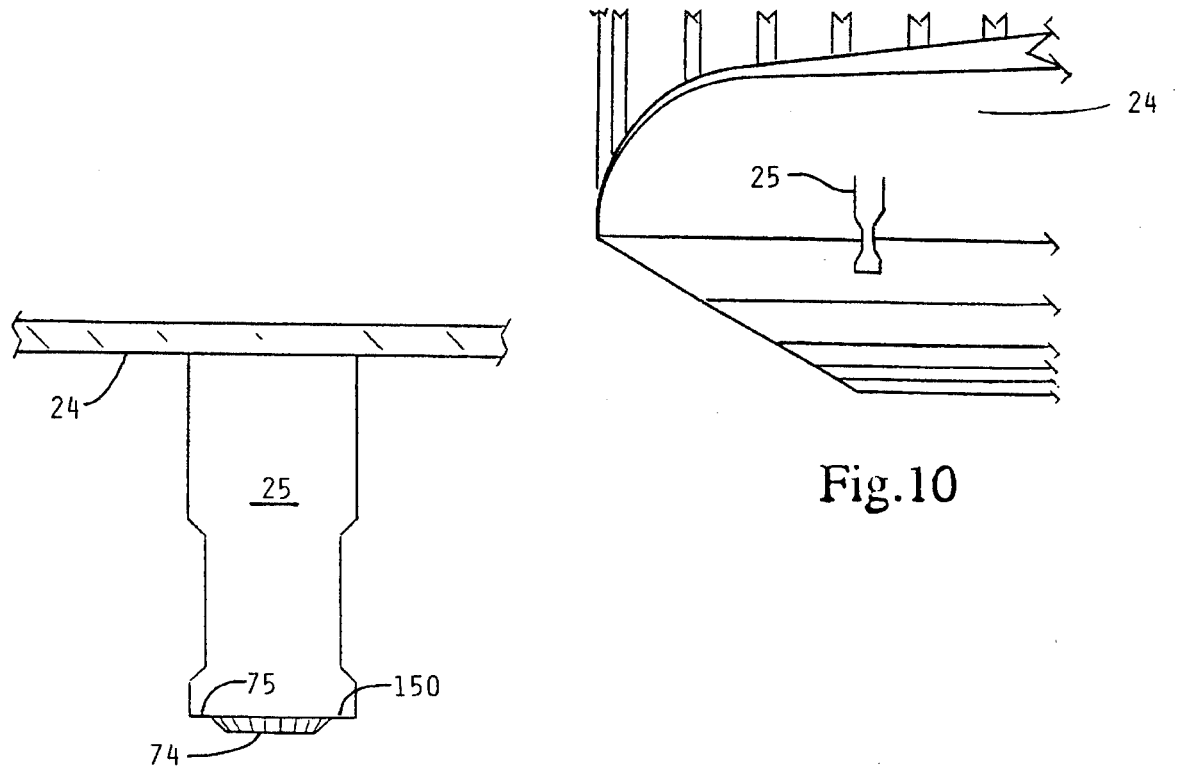
Fig.10
Fig.11
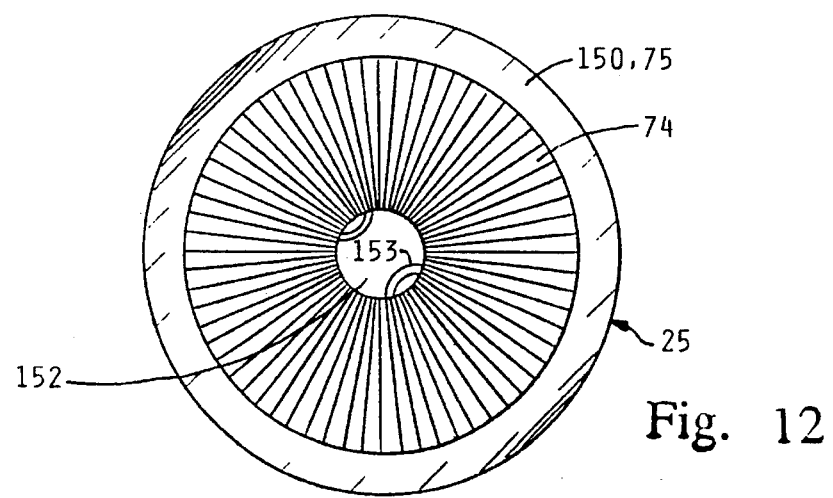
Fig. 12

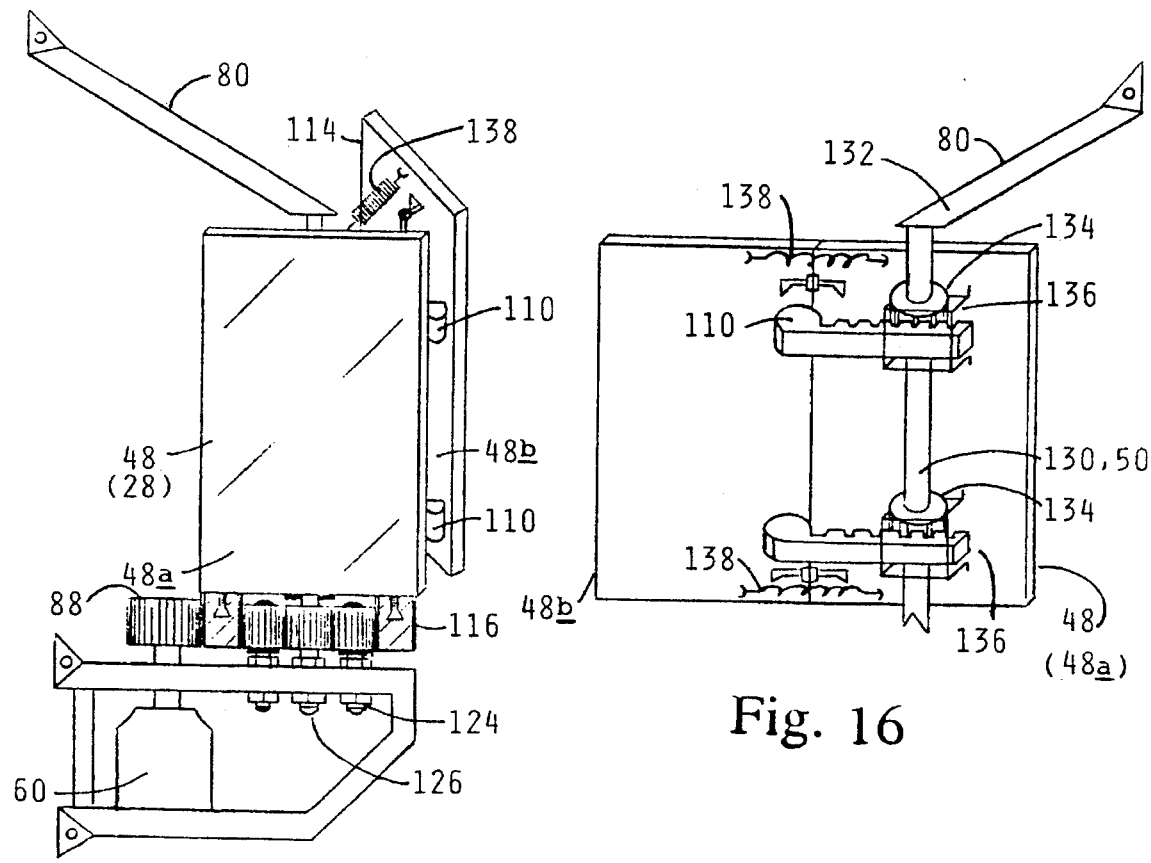
Fig. 15
Fig. 16
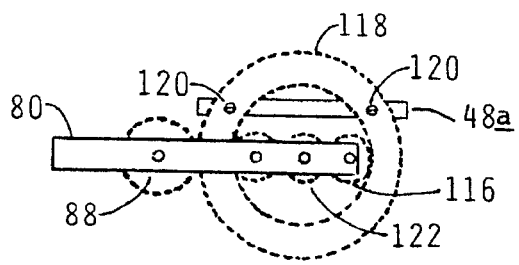
Fig. 17

ROTATIONAL SAFETY MIRROR INSTALLATION FOR VEHICLE CONNECTED IN TANDEM

FIELD OF THE INVENTION

The present invention relates to vehicles, and more particularly to tractor-semi-trailer vehicles which are commonly called "semi-trailers" or more commonly just "semis."

Semis are usually of a large size, so much larger than the largest of trucks, that semis, in contrast to trucks, have for many decades been made of a tandem nature, i.e., the overall vehicle has been made of a two-unit nature, with the rear of the pulling vehicle, i.e., the tractor, being joined to the front of the pulled vehicle, i.e., the trailer.

For semis, the need for maneuverability has caused the connection of the tractor to the trailer to be by a pivotal, single joint, intentionally, so as to provide for the needed swinging of the trailer with respect to the tractor during turns.

Particular problems, which many years of very commercially competitive prior art have not solved:

The maneuverability, which pivotal-connection between the tractor and the trailer advantageously provides for maneuverability of the long overall vehicle, also and inherently causes a very disadvantageous and dangerous problem.

Yet, so far as this inventor has ever known, it is a serious safety problem never solved prior to this invention, of a bad and often dangerous lack of vision of a driver throughout certain often-occurring situations, both a forward and rearward safety problem never solved prior to this invention.

And even though the problem is most critical as to rear view ineffectiveness when the semi is travelling at a very slow speed, it is at slow speed when a child or unwary pedestrian seems most likely to be near the rear end of the trailer. Conventional rear-view mirrors become practically useless in many turn situations, as explained herein.

More particularly, the tractor unit of a semi-trailer seems to have always provided a rearview mirror of a type which is fixed and non-moving type. (Even mirrors which have adjustable holding brackets are "fixed and non-moving" in the sense here criticized.) These fixed mirrors impose great burdens on the truck driver when making a turn, especially a right-hand turn, because during such a turn, the right-outside mirror on the tractor is reflecting a useless view of the forward side of the trailer, and only its forward side portion.

But, it is the rear end of the trailer, which the driver does not and cannot see, which is the most likely region around the tractor or trailer to have a vision-caused accident, whether that be an accident to a child wandering onto the street or roadway, or the trailer scraping against a car parked along a curb near an intersection at which the driver is attempting to make a right hand turn, or other mishap or tragedy.

The entirety of the world's Prior Art failures to solve this safety problem:

III.a. Inadequacy of an "observer" method:

The present inventor has not seen accident records as to semis which specify statistics as to this particular vision problem, but has observed many instances in which some helper of a semi driver stands nearby, and, as the observer yells instructions (which are probably often uncertain or not precise) to the driver as to the apparent manuevering room, as it is changing during the right hand turn (or left-hand turn if the turn is during a backing movement), the chances of a serious accident are indeed foreseeable.

This "observer method" is a labor-wasting procedure, and can scarcely be considered as wholly reliable nor as wholly acceptable; and mis-judgement by the observer and/or the driver adds to the lack of confidence as to the "observer" method.

Even less acceptable is a procedure in which there is no readily qualified observer, or when there is any difficulty of communication from an observer, whether due to the yelled nature of the instructions or due to a misunderstanding or other lack of accurate communication; always a dangerous possibility looms likely.

III.b. Short turn radius accentuates the danger:

Of course, the safety-problem is increased where the semi is entering or leaving a street which is narrow, because the turn is "tight," or heavily traveled such that the driver must be very careful, especially when backing, to not proceed onto a wrong lane of traffic to try to get the maneuver's benefits of an undue or easier (larger) radius of curvature.

And although tightness ("sharpness") of a turn maneuver inherently means the trailer will be traveling at a slow speed, and although slow speed usually would mean a minimal dynamic impact force in an accident, the dangerous lack of vision caused by a tight turn's wide angular relationship of tractor and trailer means a very grave danger anyway, by the increased likelihood of an accident caused by the vision problem which is advantageously here solved by the present invention.

III.c. Other prior art attempts, as also showing failures:

The prior art's provision of fixed rear vision mirrors has been already shown to not solve this dangerous problem; and vision-field expander sheets or the provision of an extra supplemental mirror yield some increase in the driver's field of view, but each of these seems to be vision-distorting, especially as to the vital factors of distances and other maneuvering considerations.

Extra-wide mirrors provide some help, but are not believed to give a proper wide-angle benefit.

Likewise, wide angle or curved face mirrors are misleading and dangerous, and give more angle of vision only at the expense of clarity and size of the view seen through the mirror.

BRIEF SUMMARY OF THE PRESENT INVENTION

The present invention provides a novel solution to a safety problem of driving a semi; and more particularly, in the common semi-trailer situations of a tight right hand forward turn and in a left backing turn, what a semi driver needs to see most is the rear and rear wheels of the trailer. However, a clear, undistorted view of the rear portion of the trailer throughout the entire turn is not possible with existing mirror set-up mountings, even though it is the rear of the trailer, along with its rear wheels, that come closest to hitting roadside objects, curbs, street posts, parked or stopped automobiles, and perhaps even persons.

Although these vision-limited dangers of fixed mirror-mountings are manifest, they are inherent with the intentional single connection of tractor and trailer, pivotably about the unit's "kingpin" for maneuverability; for the wide "outswinging" of the trailer during turns positions its rear portion out of the mirror's vision-scope.

As a solution of this dangerous problem, the tractor's right-side rear vision mirror is provided to be movable about a vertical axis, and provided with special controls, one of them to be noted as being a monitor means for continuously automatically monitoring the angle of which the semi's tractor and trailer components pivot with respect to one another throughout the turn being made, and the other control moving the mirror a special angular amount, depending on how far outwardly the trailer has swung, i.e., its relative position, affording the driver an undistorted view of the critical rear end of the trailer by automatically positioning the mirror and its sight-vision scope as the turn is being made.

The apparent relation of angle of relative swing during the turn is not the desired angle of rotation provided for the mirror, but the desired mirror-angle is shown herein by graphic illustration and by calculation as to what the inventor believes to be workably close to the optimally desired mirror-position for maximizing critical vision throughout successive portions of the maximum turn.

(Without limiting the concepts or this use, the concepts are illustrated throughout as used for and with only a right side mirror mounting, because most pulling vehicles in the United States are provided for the driver to be seated on the left side, in conformity to right-lane driving in the United States, and because during a left turn the driver can thus look backwards out his left-side window. Herein, this is thus for that purpose of brevity, but not for limitation.)

The mirror's controlled rotation is provided to be one-half the angle which is a special and changing-value function of the amount of rotational swing of the trailer in the turn, at any portion of the turn.

Several inner-related and cooperating components provide the control for the mirror, as depending upon how much is the relative swing between the tractor and trailer during a turn; and in the illustrative embodiments the most apparent ones of those components are a stepper motor, a control box containing various electronic components, and a rotary encoder, with related electric and mechanical components, each of which individually is known to those skilled in the art, as individual components, although not in the cooperative combination which achieves safety coordination of the mirror-view and the trailer-swing, and thus those components are set forth herein in somewhat abbreviated form. Prior Art capability, as helping to show patentability here:

In a hindsight consideration of the present invention to determine its inventive and novel nature, it is not only conceded but emphasized that the prior art had many details usable in this invention but only if the prior art had had the guidance of the present concepts of the present invention; and there are other prior art details of invention determination.

That is, it is emphasized that the prior art had/or knew several particulars which individually and accumulatively show the non-obviousness of this combination invention:

a. The prior art has long had knowledge of the dangers and other disadvantages of effectively-blind right turns of semis;

b. The prior art has long had knowledge of the single-point (kingpin) joinder of semi vehicle components, and knew of inevitability of "trailer swing" throughout all turns;

c. The prior art has long had knowledge of the fact that trailer-swing is most measurable or determinable at and adjacent the kingpin;

d. The prior art had long known and used various types of gearing in addition to conventional center-axis gears with fixed axis pinions, and including gears with off-center axis, sliding-axis gears and pinions, planetary gears, etc.;

e. The prior art had known and used bevel gears, and had known of their advantages-and special operating characteristics;

f. The prior art had known and used many sorts of brackets and many sorts of springs;

g. The prior art had known and used stepper motors, rotary encoders, and various types of electric and electromechanical controls;

h. The prior art had had centuries-old knowledge of mathematics, including algebra, trigonometry, geometry, and other applications of mathematical and mathematics-applied concepts and procedures.

i. The prior art knew graphical determinations for calculations and for proofs;

j. The prior art had known and used in various applications the concept of relating sets of-moving bodies in other than a one-to-one ratio or fixed ratios; and k. The prior art for several years has known of electric and electromechanical components and devices which can provide a controlled relation of one set of components to another set of components in a varying relation of the sets.

In spite of all such factors of the prior art, long known, the problem here solved awaited this inventor's creativity. More particularly, as to the novelty here of the invention as considered as a whole, a contrast to the prior art helps show its contrast to the present concepts, and emphasizes the advantages and the inventive significance of the present concepts as are here shown, particularly as to providing special utility and long-needed safety considerations.

However, prior art devices known to this inventor, which could possibly be adapted for this duty, fail to show or suggest the details of the present concepts as a combination; and a realistic consideration of the prior art's differences from the present concepts of the overall combination may more aptly be described as teaching away from the present invention's concepts, in contrast to suggesting them, even as to a hindsight attempt to perceive suggestions from a backword look into the prior art, especially since the prior art has long had much motivation as to apparatus of the present invention.

And the existence of such prior art knowledge and related articles embodying such various features is not only conceded, it is emphasized; for as to the novelty here of the combination, of the invention as considered as a whole, a contrast to the prior art helps show both the great variety of the various prior art capability as to components and in their usability and uses separately from the present combination, and in spite of long need a seemingly uncaring lack of acceptable attempts of improvement, and show advantages and the inventive significance of the present concepts. Thus, as shown herein as a contrast to all the prior art, the inventive significance of the present concepts as a combination is emphasized, and the nature of the concepts and their results can perhaps be easier understood.

Although varieties of prior art are conceded, and ample motivation is shown, and full capability in the prior art is conceded, no prior art shows or suggests details of the overall combination of the present invention, as is the proper and accepted way of considering the inventiveness nature of the concepts.

That is, although the prior art may show an approach to the overall invention, it is determinately significant that none of the prior art shows the novel and advantageous combination, which provides the merits of this invention, even though certain details are shown separately from this accomplishment as a combination.

Accordingly, the various concepts and components are conceded and emphasized to have been widely known in the prior art as to various devices; nevertheless, the prior art not having had the particular combination of concepts and details as here presented and shown in novel combination different from the prior art and its suggestions, even only a fair amount of realistic humility, to avoid consideration of this invention improperly by hindsight, requires the concepts and achievements here to be realistically viewed as a novel combination, inventive in nature. And especially is this a realistic consideration when viewed from the position of a person of ordinary skill in this art at the time of this invention, and without trying to reconstruct this invention from the prior art without use of hindsight toward particulars not suggested by the prior art.

BRIEF DESCRIPTION OF THE DRAWINGS

The above description of the novel and advantageous invention is of somewhat introductory and generalized form. More particular details, concepts, and features are set forth in the following and more detailed description of an illustrative embodiment reference being had to the accompanying generally diagrammatic and schematic drawings, in which:

FIG. 10 is a small pictorial detail view of the underside of the trailer, illustrating the downwardly extending-kingpin;

FIG. 11, in larger scale than FIG. 10, illustrates the the underside of the trailer and the kingpin, with the driving bevel gear of the monitor mechanism shown attached to the underside of the kingpin;

FIG. 12 is an underside view or bottom view of the kingpin head with the large bevel gear shown attached, in much larger scale than FIG. 11;

FIG. 13 illustrates a mirror gear which rotates about an off-center axis, it meshing with a sliding pinion gear, the effect being that each increment of pinion gear rotation causes an increasing increment mirror rotation as the semi gets further in the turn; and FIG. 14 illustrates a mirror drive in which the mirror gear is mounted concentrically to its gear teeth, rotating about a center axis, and the pinion gear is also mounted on a stationary axis;

FIG. 15 is an elevation view of a two-pane mirror mounted by a support bracket, and showing schematically some of its actuating or driving components, the two panels shown in a non-turning stage in which they are substantially non-aligned;

FIG. 16 is a rear view of the two panel mirror shown in FIG. 15, showing some of its control components, but omitting some which are shown in FIG. 15; and FIG. 17 is a bottom view of the mirror shown in in FIG. 15, with portions omitted.

OVERVIEW OF FUNCTIONALITY AND SAFETY CONCEPTS

Figure 1:
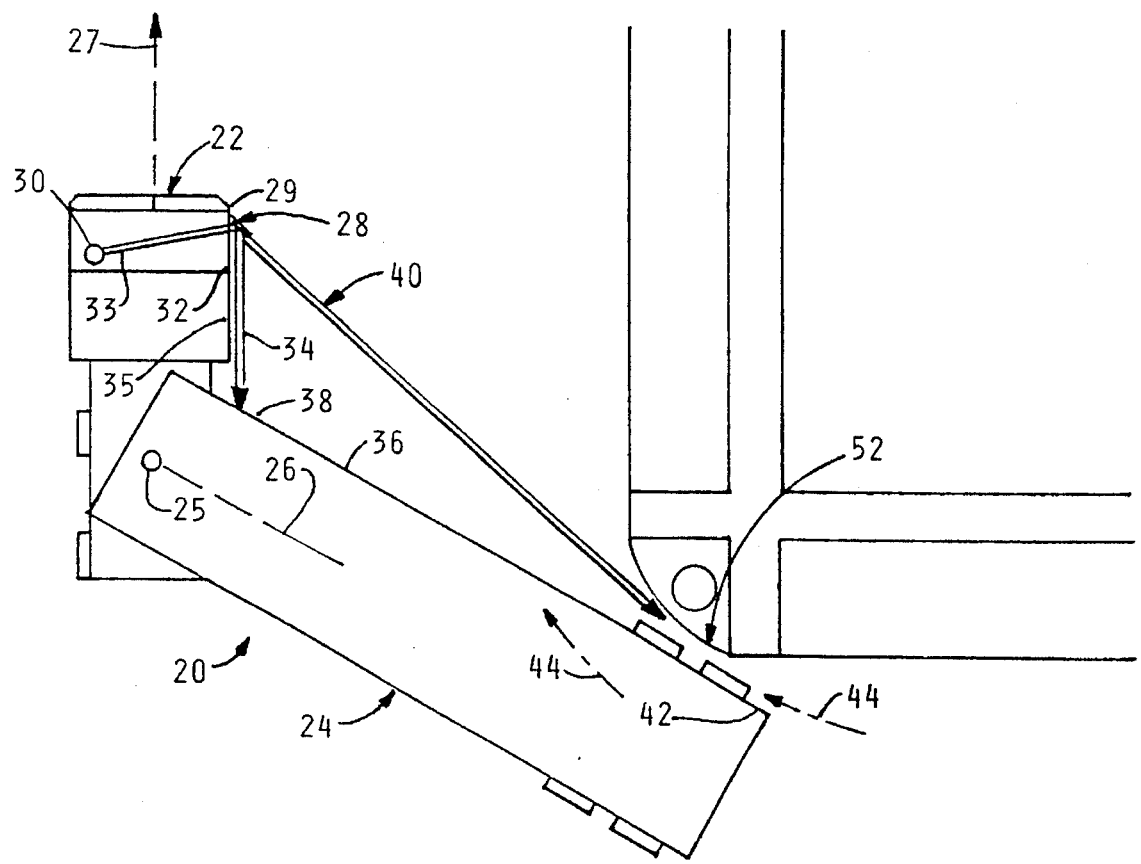
FIG. 1 is a plan view illustrating a semi making a right hand turn, the pulling tractor being shown as already having turned rightwardly, and the pulled trailer having turned a part of the full turn, the trailer's rear end and rear wheels shown as adjacent a street corner past which the semi is making the turn maneuver, with the "rotating mirror" shown giving its turn-safety advantages over-a mirror's "normal view" during the turn.

As shown in FIG. 1, a semi unit 20 is shown as a pulling tractor 22 and a pulled trailer 24. They are interconnected by a single pivotable joint 25, that being the kingpin 25 of the unit 20, at the forward end of the trailer 24's centerline 26.

The two vehicles are shown in the making of a forward, right hand turn, the tractor 22's motion and direction being shown by arrow 27.

A rear-view mirror 28 is shown as mounted on the right (29) outside portion of the tractor 22, at a location at which the driver, at a seat location 30, can see the mirror 28 through his right side window 32, by vision 33 toward the mirror 28.

With a fixed mirror 28, as shown by the view-arrow 34, the prior art view by the fixed mirror 28 for the driver provides him a mirror "normal view" (arrow 34) which is a vision centered along the entirety of the right outside 35 of the tractor 22; and, although the normal view 34, in a non-turn situation, would be centered also along the entirety of the trailer's right side 38 in an in-line (aligned) straight-ahead tandem arrangement of the tractor 22 and the trailer 24, FIG. 1 illustrates that during the tractor 22's right forward turn maneuver 27 the driver's normal view 34 is practically useless, i.e., it shows merely the front-portion 38 of the trailer 24, hardly a likely place for an accident to be caused or to occur.

The safety view 40 (as shown by view arrow 40 in FIG. 1), illustrates the safety vision of the safety view 40 achieved by the present invention, i.e., a safety view 40 being centered on the right side of the rear portion 42 of the trailer and trailer's rear wheels, which, by their great distance from the tractor 22 and their movement along a path 44 different from that of the tractor 22, can be considered to be the most unsafe portion 42 of the trailer 24.

Figure 6:
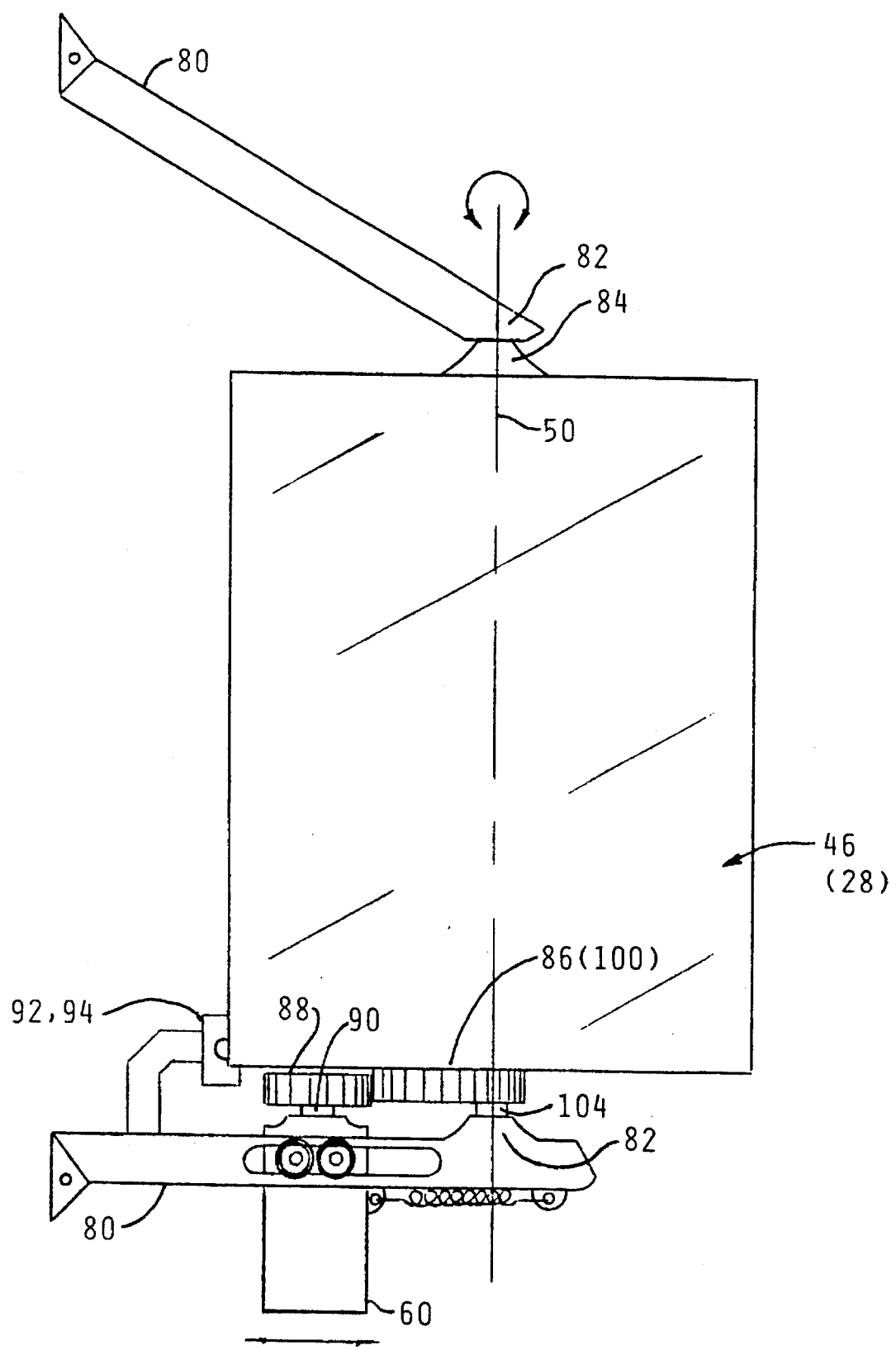
FIG. 6 is an elevation view of a mirror, of single-panel nature, as supported by control equipment to achieve the mirror-rotation which is the subject of this invention.

According to the present invention, the mirror shown diagrammatically as 28 in FIG. 1 is provided to be rotatable, as is illustrated by the two embodiments, i.e., a rotating mirror 46 of FIG. 6 and a rotating mirror 48 of FIGS. 15–17; and as explained herein, each of these safety mirrors 46/48 rotates about a vertical central axis 50, and are provided with turn monitoring control components, giving the driver a safety view 40, i.e., an undistorted view of the critical right side 42 of the rear end of the trailer 24, for achieving the much-needed safety and safe clearance from the curbside area 52.

Geometric and algebraic showing of operativity:

With the safety concepts' achievement of FIG. 1 and its commentary in mind, the text and drawings illustrate and show, both geometrically and algebraically, the key concept to the invention, that is, an acceptably accurate although apparently complicated system whereby a semi tractor mirror follows a change in angle by the amount "a", in which the inventor has found to be the value of "a" to be a certain function of the angle "b" (FIGS. 2 and 3) that the semi tractor 22 makes with the semi trailer 24 during a turn. Furthermore, when the mirror follows this function, it will always give the semi driver a clear view of the rear 42 of the trailer 24, no matter where he is in his turn.

In consideration of the mathematical showings, the concept (FIG. 2) of "home position" 54 is the sight as seen by the mirror 28's position centered along the right side (35, 36) of the tractor 22 and trailer 24, respectively, when the trailer 24 is directly in line behind tractor 22, thus is the "normal" view 34 of the mirror 28's position in FIG. 1.

Figure 2:
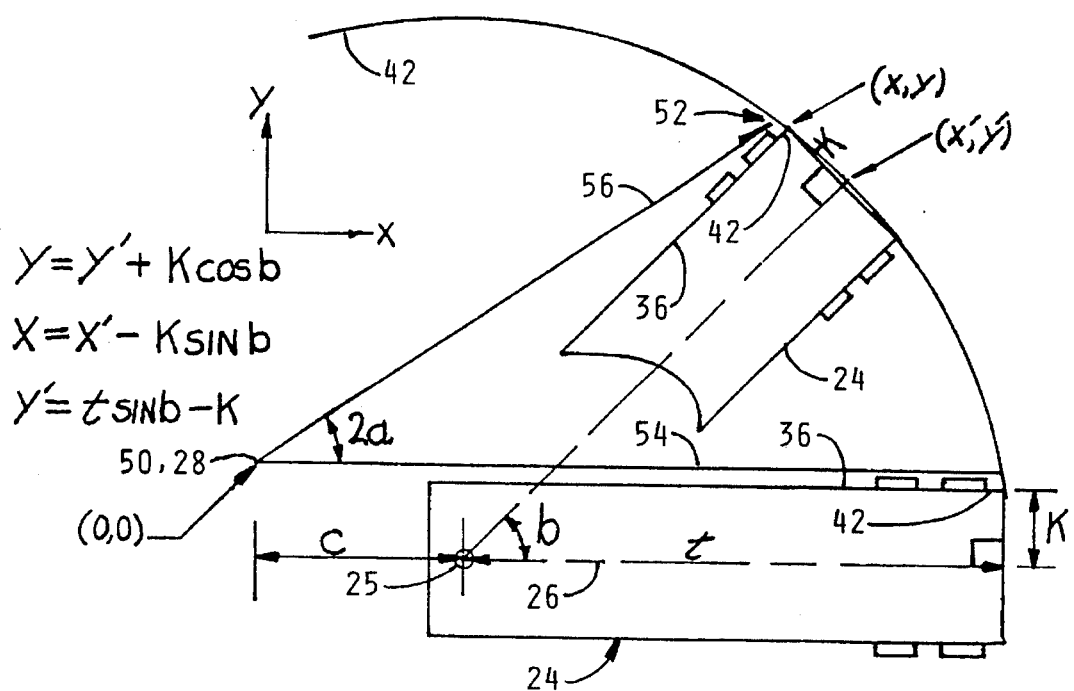
FIG. 2 is a schematic representation of the out-swung (plan view) condition of the pulled turn vehicle during the posted or entered onto the view.
Figure 3:
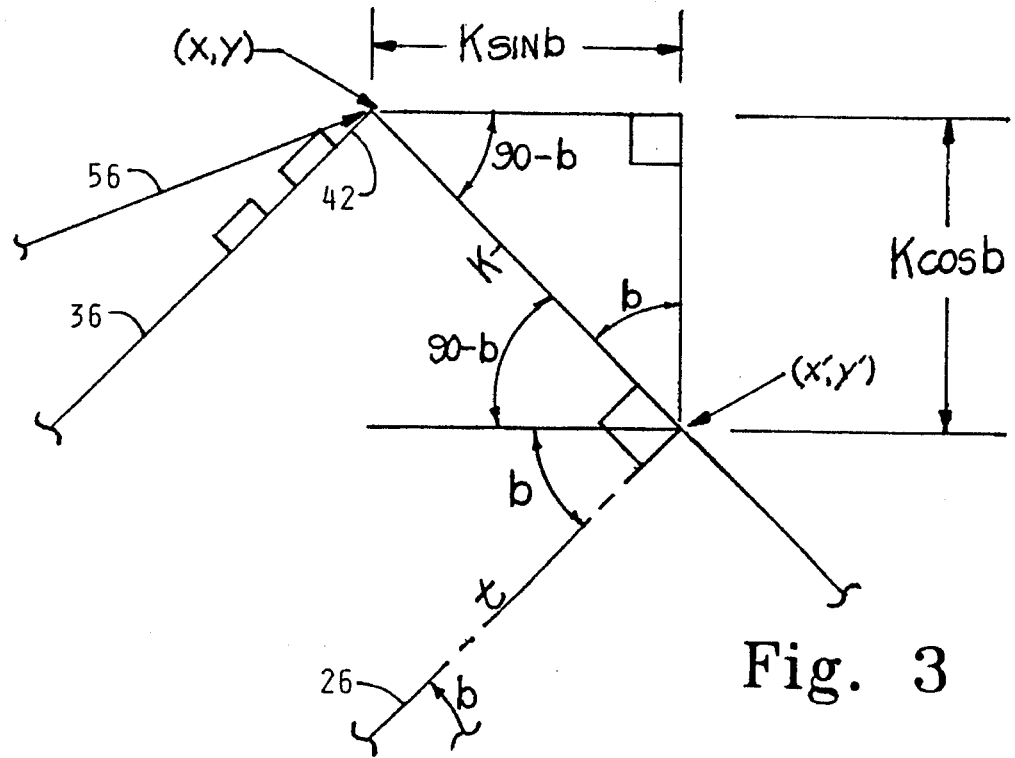
FIG. 3 is an enlarged detail view of the inside-of-the-turn (right) side of the rear end of the trailer as per FIG. 2, but also showing some other reference condition markings.
Figure 4:
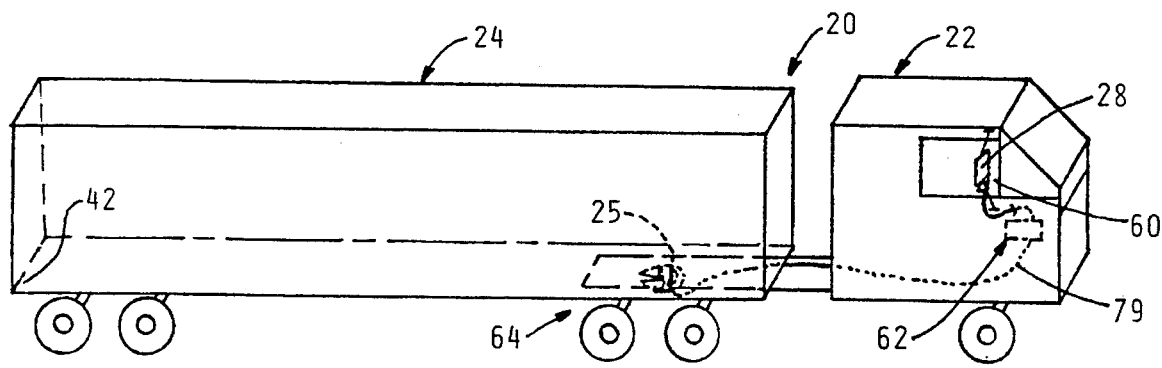
FIG. 4 is a pictorial illustration of a semi, with control components shown thereon, indicated on the generally side view.

Similarly as a reference to FIG. 2, the "viewing angle in a turn" 56 indicates the path of the safety view 40 of FIG. 1; i.e., the angle by which the vision through the mirror 28 is directed to the trailer's rear 42.

The following analysis shows basically the angular relationships involved; more particularly the following analysis defines the exact changes of viewing angle (2a) and mirror angle (a) which occur as a trigonometric function of the tractor-trailer angle (b) of $0° \leq 2a \leq 90°$ where $2a=0°$ at "Home" position 54.

The following development utilizes the parameters from the above figures, along with the disciplines of geometry, trigonometry, and algebra, to prove mathematically: The cab mirror 28 can be rotated an angle "a" degrees such that the driver's viewing angle 56 will maintain the rear-end of the trailer 42 in his view, no matter at what point the driver is in his turn. Furthermore, the development will show that this angle "a" of mirror rotation is a direct function of the tractor/trailer angle "b" and the parameters "t", "K", and "C" and will state that function.

Since:
"a" is the angle (in degrees) that the mirror is rotated outwardly from its "home" or straight-back position.
"2a" is the driver's viewing angle change during a turn away from "home" position. Note: one degree of mirror rotation causes an increase of one degree in viewing incidence, but also an increase of one degree in viewing reflection, thus totaling a two degree change in viewing angle per one degree of mirror rotation.

"b" is the angle (in degrees) that the tractor 22 makes with the trailer 24 during a turn departing from an in-line tandem position.

"t" is the trailer length (in feet) measured from the center of the kingpin 25 to the centerline-end at the rear end of the trailer 24.

"C" is the length (in feet) from the cab mirror 28 to the kingpin 25. It is a factor of the tractor length.

"K" is one-half of the trailer width at its rear, measured in feet.

We shall let:
(x,y)=the coordinates of the desired viewing point
(x',y')=the coordinates of the centerline at the rear end of the trailer $$\tan(2a) = \frac{y}{x}$$

$$\tan(b) = \frac{y' + K}{x' - C}$$

$$x' - C = \frac{y' + K}{\tan(b)}$$

$$x' = \frac{y' + K}{\tan(b)} + C$$

$$y = y' + K\cos(b) \quad \text{(from FIG. 3 above)}$$

$$x = x' - K\sin(b)$$

$$x = \frac{y' + K}{\tan(b)} + C - K\sin(b)$$

Next, substituting the above values of y and x $$\tan(2a) = \frac{y' + K\cos(b)}{\frac{y' + K}{\tan(b)} + C - K\sin(b)}$$

Next, substituting $t\sin(b) - K$ for $y'$ $$\tan(2a) = \frac{t\sin(b) - K + K\cos(b)}{\frac{t\sin(b) - K + K}{\tan(b)} + C - K\sin(b)}$$

Simplifying, $$\tan(2a) = \frac{t\sin(b) + K(\cos(b) - 1)}{t\cos(b) - K\sin(b) + C}$$

Or, $$a = 1/2 \tan^{-1}\left(\frac{t\sin b + K(\cos b - 1)}{t\cos b - K\sin b + C}\right)$$

This expression gives the amount of mirror rotation "a" as a DIET FUNCTION of the tractor/trailer angle "b" and the parameters "t", "K", and "C".

Figure 5:
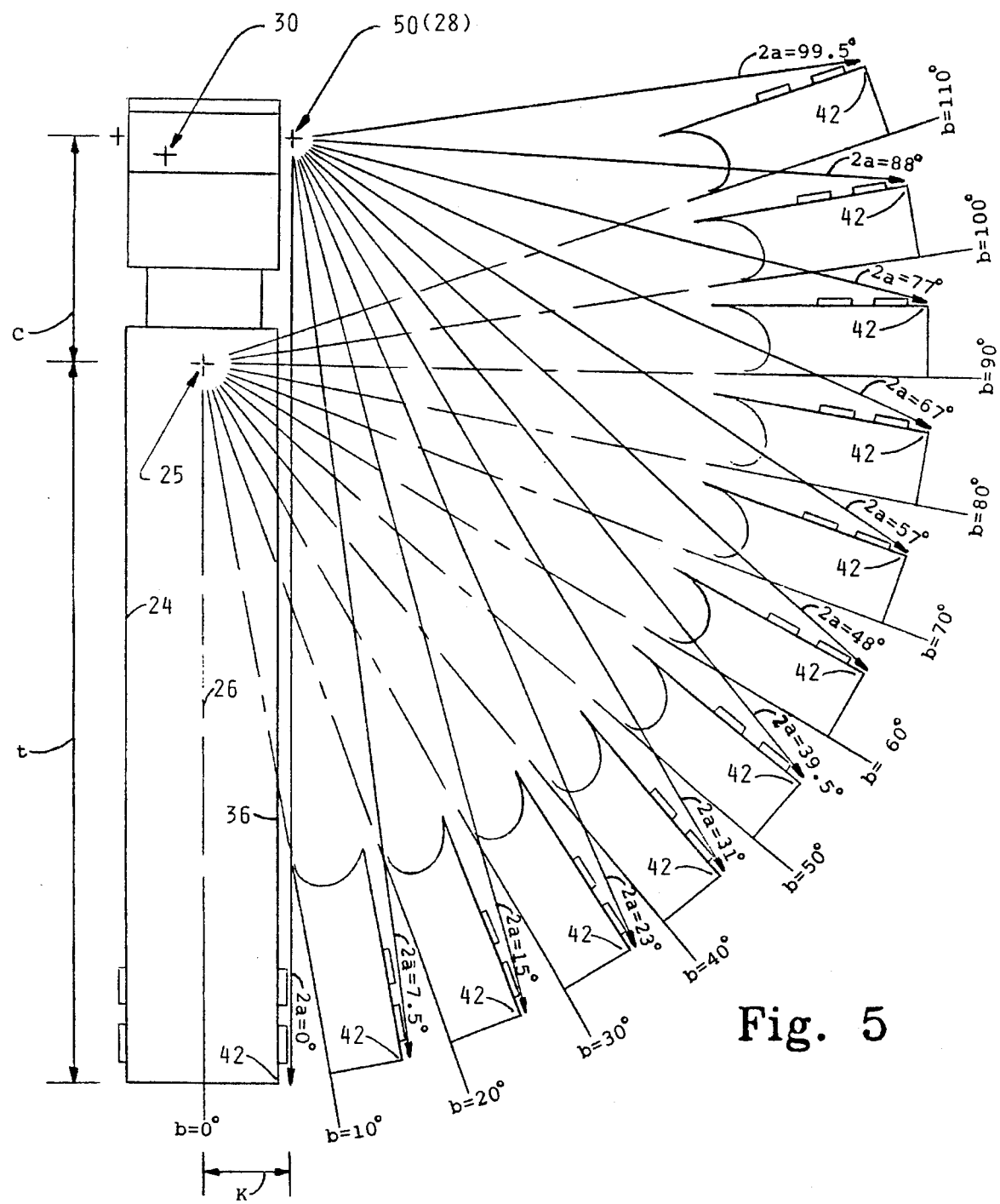
FIG. 5 is a schematic, graphical proof of the calculation shown for the parameters in the illustrative calculation set forth herein, and also illustrating in FIG. 5 the tractor and trailer in plan view and with the trailer shown schematically as having swung relatively outwardly all of the ten degree increments from 0° to 110°, shown by the sequential values of the angle "b", and showing graphically that the swing of the trailer in those particular increments of 0° through 110° puts the right side of the trailer's rear end at an angle "2a" which at the outwardly-swung trailer condition of 50° shows a value for the mirror rotation "2a" to be 39.5° as graphically shown in FIG. 5, and confirming the calculated value of 39.8° shown in the illustrative calculation, and showing in the tabulation.

The following tabulation, in conjunction with FIG. 5, demonstrates the accuracy of the above equation. In FIG. 5, typical values of "t"=38 ft., "K"=4½ ft., and "C"=12 ft. are chosen parametric values, while the tractor/trailer is shown at eleven arbitrarily selected points of a turn (angle "b"=10, 20, 30 . . . 110 degrees). At each of these eleven values of angle "b", the corresponding viewing angle "2a" is theoretically calculated from the above equation. The viewing angle "2a" is also measured with a protractor from the figure as graphically close as possible. The two values, theoretical and measured, of angle "2a" are in very close agreement, illustrating the validity of the above mirror equation, as now shown:

TRACTOR/TRAILER ANGLE "b" (arbitrarily selected): 10° 20° 30° 40° 50° 60° 70° 80° 90° 100° 110°

THEORETICAL VIEWING ANGLE "2a" (computed from equation above):

7.6° 15.4° 23.3° 31.4° 39.8° 48.5° 57.6° 67.2° 77.4° 88.3° 100.0°

MEASURED VIEWING ANGLE "2a" (protractor reading from FIG. 5):
7.5° 15.0° 23.0° 31.0° 39.5° 48.0° 57.0° 67.0° 77.0° 88.0° 99.5°

The following shows the actual mathematical calculations for one of the above values of angle "b", the one where angle "b" equals 50 degrees: Example: b=50°; t=38 ft.; K=4.5 ft.; C=12 ft.; 2a=?

$$\tan(2a) = \frac{t\sin(b) + K(\cos(b) - 1)}{t\cos(b) - K\sin(b) + C}$$

$$\tan(2a) = \frac{38\sin(50) + 4.5(\cos(50) - 1)}{38\cos(50) - 4.5\sin(50) + 12}$$

$$\tan(2a) = \frac{(38)(0.766) + (4.5)(0.643 - 1)}{(38)(0.643) - (4.5)(0.766) + 12}$$

$$\tan(2a) = \frac{29.1 + (4.5)(-0.357)}{24.4 - 3.45 + 12}$$

$$\tan(2a) = \frac{29.1 + (-1.61)}{21.0 + 12}$$

$$\tan(2a) = \frac{27.5}{33}$$

$\tan(2a) = 0.833$
$2a = \tan^{-1}(0.833)$
$2a = 39.8$ degrees

The remaining other theoretical values are computed in a similar manner; Furthermore, it can also be shown graphically, that the above mirror equation generates equally valid values of the viewing angle "2a" for rigs of different tractor length "C", trailer length "t", and trailer width "K".

Description of components in the illustrative embodiments of the invention:

The components as shown are here described first somewhat briefly due to prior art knowledge of them as individual items apart from the present invention.

IX.A. Tractor 22 Components, introductorally:

a. Rotating Mirror 28 (46/48): It takes the place of existing outside rearview mirror, and is mounted in the same location on the tractor.

b. Stepper Motor 60: The small motor which mounts to the frame of the rotating mirror and rotates the mirror 28 in precise angular increments.

c. Control Box 62: Mounted in the tractor 22's cab. It contains the necessary electronics to receive pulses from the rotary encoder 64 and translate them into corresponding drive pulses to the stepper motor 60 to drive the mirror 28 by prior art this may be accomplished by such components as a quadrature decorder/counter, a microprocessor with memory, and a step motor driver. An operator's interface allows the entering of different parameters by the driver. The control box 62 also allows the driver to enable or disable the rotating mirror 28 as he chooses, and to adjust the "home" (straight back) position of the mirror 28 (viewline 34 of FIG. 1 and 54 of FIG. 2).

d. Rotary Encoder 64: It mounts under the receiver 68 of the tractor 22 and has a small bevel gear 70 attached to to its shaft 72. This small bevel gear 70 engages or meshes with a larger bevel gear 74 attached to the bottom 75 off the trailer kingpin 25. Thus any angular movement between the tractor 22 and trailer 24 (while they are joined), as during a turn, will cause the rotary encoder 64 to send a series of pulses to the control box 62. The number of pulses will be proportionate to the amount of turn or angle "b" between the tractor 22 and trailer 24, thus telling the mirror 28 how much angle "a" to rotate, the direction (phase) of the pulses telling the mirror 28 which way to rotate (outward or inward), depending upon whether the semi 20 is entering a turn or coming out of a turn.

e. Connecting Cables 79: They electrically connect the control box 62 to the rotary encoder 64 and to the rotating mirror 28 mechanism.

IX.B. Trailer 24 Component, introductorally:

a. Large Bevel Gear 74: Mounts to the bottom 75 of the trailer kingpin 25. This is the only component in the illustrative embodiments which attaches to the trailer 24. This gear 74 engages the smaller bevel gear 70 on the shaft 72 of the rotary encoder 64, monitoring or keeping track of the angle "b" between the tractor 22 and trailer 24.

IX.C. Specifics of various components of the tractor 22:
IX.C.(a) Rotating Mirror 28: FIGS. 6 and 15 illustrate two models of the rotating mirror 28. The single pane mirror 46 (FIG. 6) has a glass measurement of approximately 10" wide by 15" high. This is the same height as what seems to be the standard semi outside mirror; but it is wider in order to help compensate for the narrowing field of view when the mirror 28 rotates outward during a turn.

The single pane 46 would be attached to the semi tractor 22 by means of a tubular steel bracket 80 similar to existing brackets with the following differences: The bracket 80 is shown to have two low-friction pivot bushings 82, one at the top the other at the bottom, which will allow the mirror to pivot or rotate about its center vertical axis 50. The top of the mirror pane 46 has a rigid pin 84 attached at the center. This pin 84 mates with the top pivot bushing 82 on the bracket 80. The bottom of the mirror pane 46 has a nylon gear 86 securely attached at the center.

This nylon gear 86 is driven by a smaller nylon gear (pinion) 88 attached to the output shaft 90 of the stepper motor 60. The stepper motor 60 is mounted on the bottom bracket 80.

An adjustable screw stop micro switch 94 also are securely mounted to the bottom bracket 80 to physically limit the inward travel of the mirror 46 as it is returned to "home", position i.e., the "normal" view 34 (and 54) as the semi 20 comes out of its turn, the micro switch 94 thus cutting off the reverse current to the control motor 60 by signalling the control box 62 that the mirror 28 (46) has returned to home position just before it hits the adjustable screw stop 92. The screw stop 92 thus acts as a hard limit when there is no motor current, the micro switch 94 acting as a soft limit telling the control box 62 to shut off reverse current, because the mirror 28 has returned to "home" position of sight 34 (54) along the tractor 22's side surface 35.

Figure 13:
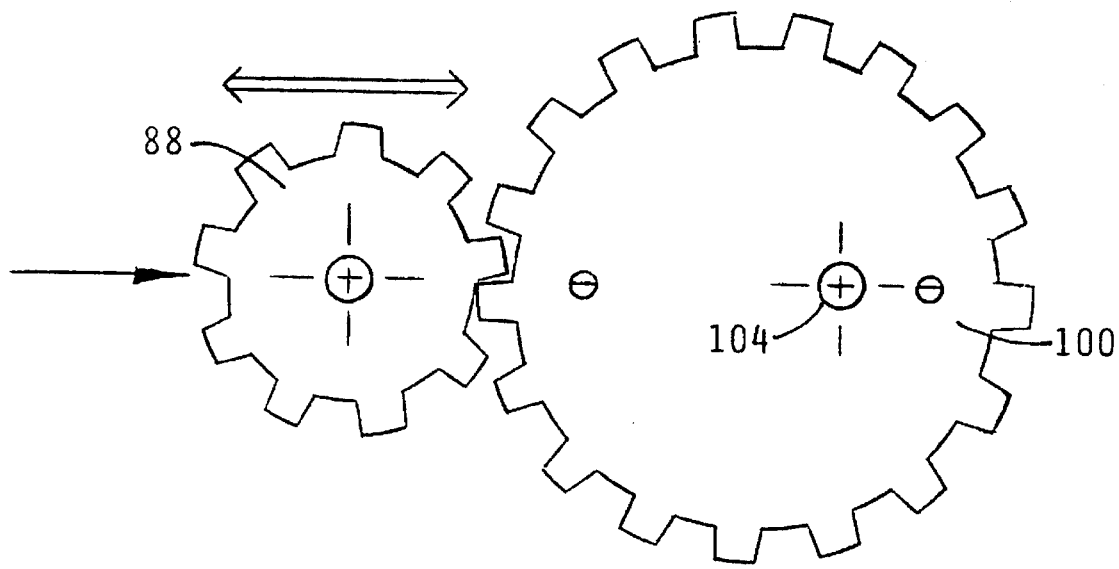
FIGS. 13 and 14 are schematic representations of mirror drives for achieving incremental angular movement of the mirror, and more particularly.
Figure 14:
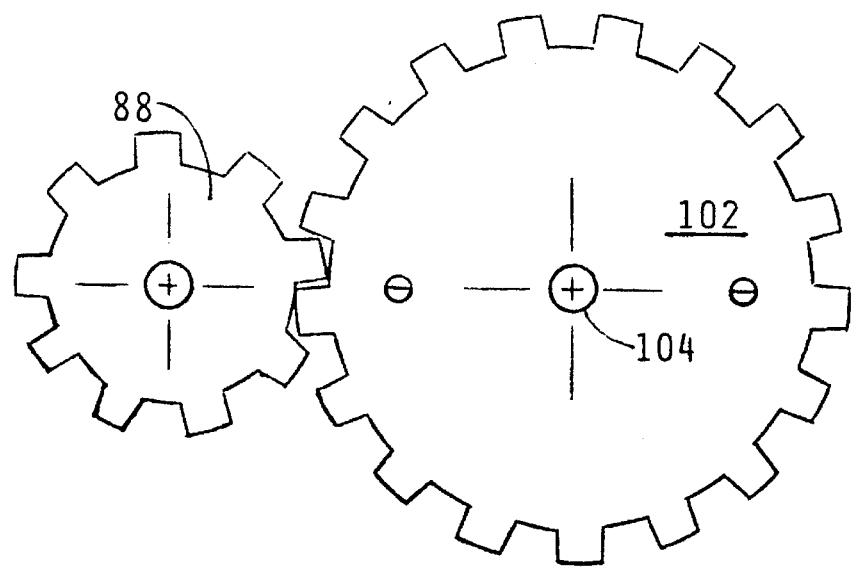

FIGS. 13 and 14 illustrate two types of nylon gears 86 that would be attached to the bottom of the mirror 28. The off-center nylon gear 100 (FIG. 13) may be used in conjunction with a lesser expensive control box 62, i.e., a control box that does not use a microprocessor. This is to accommodate the non-linearity of the mirror 28 movement "a" as a function of trailer swing "b". That is to say, the further in a turn the semi 20 goes, the more the mirror 28 has to swing ("a") outward for each degree of tractor/trailer swing (angle "b"). The off-center nylon gear 100 provides an inexpensive way to accommodate this nonlinearity; however, the gear 100 would have to be shaped or cut to match the particular tractor/trailer lengths and width.

If the more expensive control box 62 is selected, a microprocessor would keep track of the nonlinearity; and the tractor/trailer parameters (lengths and width as noted) would be directly entered in by the driver. Also, the microprocessor would contain an algorithm based upon the mirror equation shown above, and thus would not require an off-center gear but rather a regular nylon gear 102 (FIG. 14).

Both the regular gear 102 and the off-center gear 100 would have a pin 104 in their center bottoms to mate with lower pivot bushing 82 of the mirror bracket 80.

A more elaborate rotating mirror 48 is also shown (FIGS. 15–17). This two-pane mirror 48 is functionally quite similar to the single-pane mirror 46; however, it would desirably incorporate twin 8" wide panes, thus offering an even wider field of view during the semi's sharp turn.

During normal (i.e., straight-ahead) driving, the driver would use only the left pane 48a, while the right pane 48b would remain folded back (FIG. 15) to reduce wind resistance, and by its retracted position keep relatively clear from striking objects. During a turn, however, the left pane 48a would begin to swing outward; at the same time, nylon pusharms 110 would begin to push the right pane 48b into alignment with the left pane 48a (FIG. 16). Once aligned, the panels 48a and 48b would rotate together throughout the rest of the turn, thus providing a full 16" wide mirror to compensate even better for the narrow field of view due to the outward swing of the trailer 24 in a tight turn.

As the semi 20 comes out of the turn, the right pane 48b would fold back, presenting again only its edge 114 to the oncoming wind, and the driver would again view only the left pane 48a.

In order to accomplish this, the two-pane mirror 48 utilizes a planetary nylon gear assembly 116 rather than a simple or off-center nylon gear used for the single-pane mirror 48. The stepper motor 80's small nylon pinion gear 88 engages the outer teeth of the mother (or ring) gear 118.

This nylon mother gear 118 is securely attached as by screws 120 to the bottom of the left pane 48a; thus when the large nylon (mother) ring gear 118 rotates with respect to the mirror bracket 80, so does the left pane 48a rotate along with the mother or ring gear 118.

Inside the large nylon mother gear 118 are three smaller nylon satellite gears 122, one in the center and two in between the center gear and the inside teeth of the large mother gear 118. The two outer satellite gears 122 are secured to pivot pins 124 attached to the bottom mirror bracket 80; and thus these two gears 122 cannot revolve in the sense of swinging movement of their pins or axes 124 about the bracket 80, but instead can only rotate or revolve about their respective pins 124. This allows these two outer satellite gears 122 to serve only one function, i.e., to transmit rotational force or torque from the large nylon mother gear 118 to the center nylon satellite gear 122. This center satellite gear 122 has a pivot pin 126 on its bottom secured to the bottom of the mirror bracket 80, and the top of the center satellite gear 122 is fastened to an aluminum drive shaft 130 that runs vertically up the back side of the left mirror pane 48a. The top of this drive shaft 130 terminates in a pivot bushing 132 at the top of the mirror bracket 80. Thus the aluminum drive shaft 130 is free to rotate about its vertical axis.

Two very small nylon gears 134 are attached to this drive shaft 130, one near the top of the left pane 48a the other near its bottom. These small nylon gears 134 drive the two nylon pusharms 110 back and forth horizontally.

For the pushing of the right pane 48b into alignment with the left by sliding across the back side of the panes, two sets of support guides 136 are fastened rigidly to the back of the left panel 48a, insuring that the pusharms move only in a horizontal line.

A small spring 138 is used to provide the return (folded position) force to the right mirror panel 48b; and, as for the single-pane mirror 46, stepper motor 60 is used to provide the driving force and positional control of the mirror 48.

Figure 7:
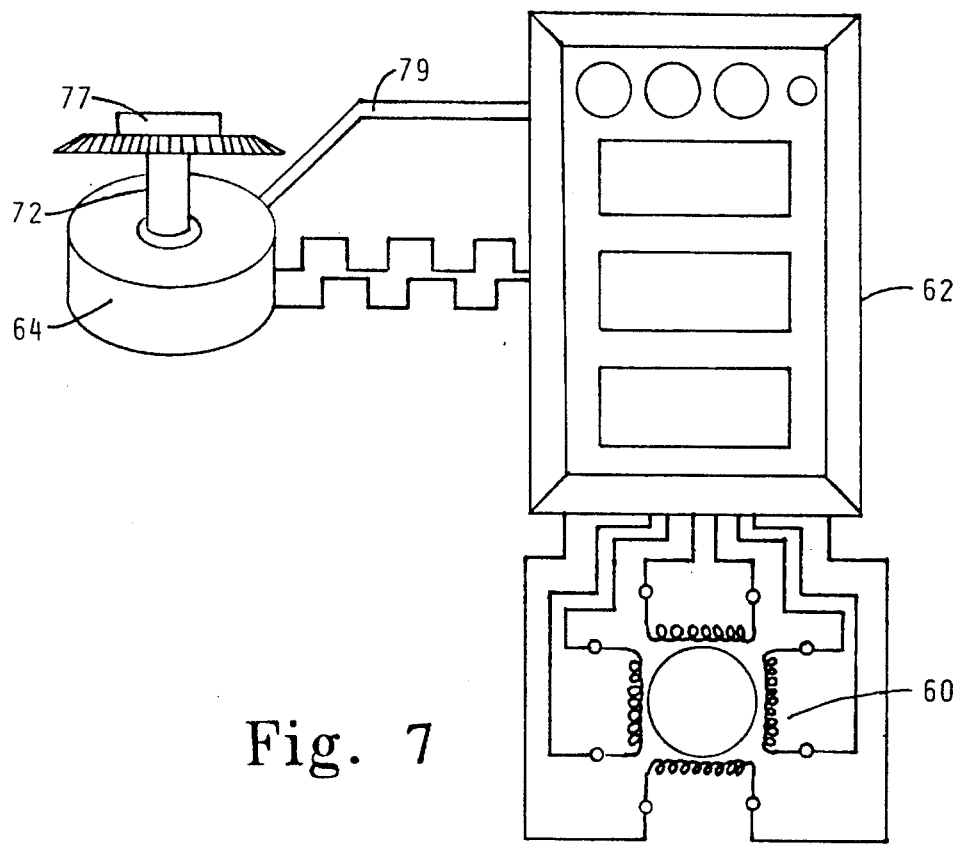
FIG. 7 is a schematic or diagrammatic illustration, in the nature of a schematic flow diagram, of the control box and the monitoring and control components used in carrying out the invention in its illustrative embodiments.

IX.C.(b) Stepper Motor: This small frame motor 60 is commonly available of types 2, 3, 4, or 5 phases, depending upon the manufacturer. FIG. 7 illustrates a 4-phase stepper motor along with its controller. The controller commonly steps the motor in 0.9 degree increments, and is used wherever precise positioning control is needed but with a relatively inexpensive open-loop (no feedback information) system.

Stepper motor 60 used on the rotating mirror 28 would need a weather-proof housings and should be able to function in temperatures as low as –40 degrees Fahrenheit. It would contain an integral gear-head with a speed reduction ratio of 10 to 1, this providing plenty of torque to move the large mirror. The stepper motor 60 would mount securely to the bottom of the mirror bracket 80; however, in the case of the single-pane mirror 46 (which utilizes the inexpensive off-center gear), the stepper motor 60 would be allowed to slide in a groove in the bottom bracket 80 of the mirror, and held with spring tension against the off-center gear 100, thus allowing for the small change in distance from the center of the stepper motor pinion gear 88 to the center of the off-center gear 100.

IX.C(c) Control Box 62: This small enclosure 62 houses the electronic components used in the system and has an operator interface front panel, and mounts inside the cab near the driver. The less expensive control has one main function, i.e., to receive pulses from the rotary encoder 64 and send the corresponding drive pulses to the stepper motor 60. It would contain a small power supply which would take the raw 12 V D.C. and output a regulated 5 V D.C. to the electronic components.

The control box 62 also looks at the phase of the quadrature signal from the rotary encoder 64 to determine direction; i.e., if the tractor/trailer swing angle "b" is on the increase (as when entering a turn), the rotary encoder 64's channel "A" would lead its channel "B" by 90 degrees, and the control box 62 would know to rotate the mirror 28 outward the proper angle "a" amount, i.e., the proper number of steps.

If, however, the tractor swing angle "b" is on the decrease (as when leaving a turn), the rotary encoder 64's channel "B" would lead its channel "A" by 90 degrees; and the control box 62 would know to rotate the mirror 28 inward (back towards "home" or view 34 and 54 position) the proper number of steps.

As mentioned earlier, the less expensive control box 62 would not contain an intelligent microprocessor, and would utilize less expensive electronics such as "J/K Flip-Flops" which would convert the rotary encoder 64's pulses to step motor 60 pulses on one-to-one basis; and the nonlinearity of the mirror rotation equation would be handled by the off-center gear 100 cut specifically to the particular tractor/trailer parameters.

The more elaborate control box 62 would contain a microprocessor, and would also keep track of both the number and direction of pulses from the rotary encoder 64, but would not send drive pulses to the stepper motor 60 on a one-to-one basis. Rather, the microprocessor circuit would contain an algorithm based upon the nonlinear-trigonometric equation.

The more elaborate control box would therefore send drive pulses to the stepper motor 64 on a non-linear basis, thus eliminating the need for an off-center gear 100 at the mirror, with the tractor/trailer parameters of length and width being directly inputted to the microprocessor by the driver by way of controls such as front panel buttons.

Either control box 62 would also have "ON/OFF" buttons to enable or disable the system as desired, and would have a button to electrically adjust the "home" or view 34 (54) position of the mirror 28 to suit the driver.

IX.C(d) Rotary Encoder 64: This small encoder 64 is commercially available from many manufactures using either optical or magnetic encoding. It is similar in appearance to a very small motor, and requires merely a 5 volt D.C. excitation source of power drawing only approximately 30 miliamperes of current. When the shaft 72 of the rotary encoder 64 is turned, it sends out a string of pulses on channels "A" and "B"; these two channels are quadrature, i.e., 90 degrees out of phase with each other.

The channel which leads depends upon the direction the encoder shaft is rotated.

The control box 52 which receives these two-channel pulses in quadrature is able to decode the direction of angle "b" change of the tractor/trailer (by which channel leads the other); also, by counting the number of pulses in the two strings, the control box 62 knows how much or how many degrees of angle "b" change has taken place. (The control box 62 than tells the mirror how much and which way to move.)

Mounted on the end of the shaft 72 of the rotary encoder is the small bevel gear 70. This gear 70 engages a similar but larger bevel gear 74 attached to the bottom 75 of the trailer kingpin 25's bottom head when the tractor 22 and the trailer 24 join together with their fifth-wheel hitch 68.

Once the tractor 22 and trailer 24 are joined and aligned with each other (swing angle "b"=0) box 62 is turned on and the rotary encoder 64 starts to keep track of any changes in the angle "b", the tractor/trailer swing angle.

The rotary encoder 64 is supportively mounted on a carrier, as shown as a spring-loaded bracket 140 that keeps the small bevel gear 70 at the end of its shaft 72 in alignment with the large bevel gear 74 on the bottom 75 of the kingpin 25's head both before and after the tractor 22 and trailer 24 join. The encoder 64 and its bracket 140 attach under and behind the forward edge of the existing fifth-wheel receiver 68 located on the tractor 22.

It is emphasized that the rotary encoder 64 and its small bevel gear 70 mating with the larger kingpin bevel gear 74 comprise the means to monitor or measure the change in the tractor/trailer swing angle "b" during driving; however, this tractor/trailer swing angle "b" is of value not only to control (angle "a") the rotating mirror 28, but can also be used to inform the driver of the exact angle changes occuring in his rig while braking, and possibly activate anti-jacknife devices.

This angle "b" swing angle is important information that has been untapped as a useful monitoring function.

IX.C(e) Connecting Cables 79: Electrical connecting cables 79 must be run from the control box 62 to the rotating mirror 28 and from the control box 62 to the rotary encoder 64. This is commonly called "signal wire" or "cable" which contains several small guage tin-coated copper conductors, individually insulated and encased in a weather resistant PVC outer jacket.

The control wire 79 from the control box 62 to the rotating mirror 28 would require one conductor for each stepper motor 60 phase, typically 4 or 5, plus two for the micro switch signal of "home" position 34 (54), and two more if an optional heater is added to the mirror 28 to keep it fog free. Thus, a signal cable containing 8 to 9 wires, each 18 to 20 AWG, would be needed from the control box 62 to the rotating mirror 28.

The control wire from the control box 62 to the rotary encoder 64 would require four conductors of 22 to 24 AWG.

IX.D. Specifics of component of the trailer 24:

a. Large Bevel Gear 74:

This gear 74 is approximately ⅜" smaller in diameter than the bottom of the kingpin 25's head surface 75, leaving a guard zone 150 of 3/16" all the way around the large bevel gear 74 to protect its teeth during tractor/trailer coupling and to provide an edge for the small bevel gear 70 of the rotary encoder 64 to bump against, thereby limiting its vertical travel and keeping it meshed.

The large bevel gear 74 (FIG. 12) is shown to have a hole 152 in its center to facilitate spot welding it (153) to the bottom 75 of the kingpin 25's head, the gear 74's thickness being necessarily small, approximately 3/16", to allow for clearance during coupling.

The large bevel gear 74 is made of steel, and is attached to the bottom 75 of the existing kingpin head, centered as close as possible.

The mating smaller bevel gear 70 mounted to the shaft 72 of the rotary encoder 64 is made from aluminum, so that little or no wear would occur in the large (steel) bevel gear 74 which would be more difficult to replace than would be the rotary encoder gear 70.

Also, the small, aluminum bevel gear 70 of the rotary encoder 64 is shown to have a collar 77 at its top, slightly smaller than the diameter top (small) edge of the bevel gear. The vertical outer edge of this collar 77 will bump against the vertical edge 78 of the kingpin 25's head during coupling, thereby limiting the horizontal movement of the small bevel gear 70 and the rotary encoder 64.

The smaller diameter of the collar 77 of the small aluminum bevel gear 70 leaves an outer flat edge 76 between the edge of the collar 77 and the edge of the kingpin 25's bevel gear 74's teeth; and this outer flat edge will bump against the abovementioned guard zone 150 of the large bevel gear 74, this guard zone 150 actually being the outer bottom 75 of the kingpin 25's head.

When these two horizontal edges 76/150 meet or bump, they limit the vertical movement of the small bevel gear 70 of the rotary encoder 64. Thus, the rotary encoder 64 is held under spring tension, keeping the large gear 74 and the small bevel gear 70 meshed.

Figure 8:
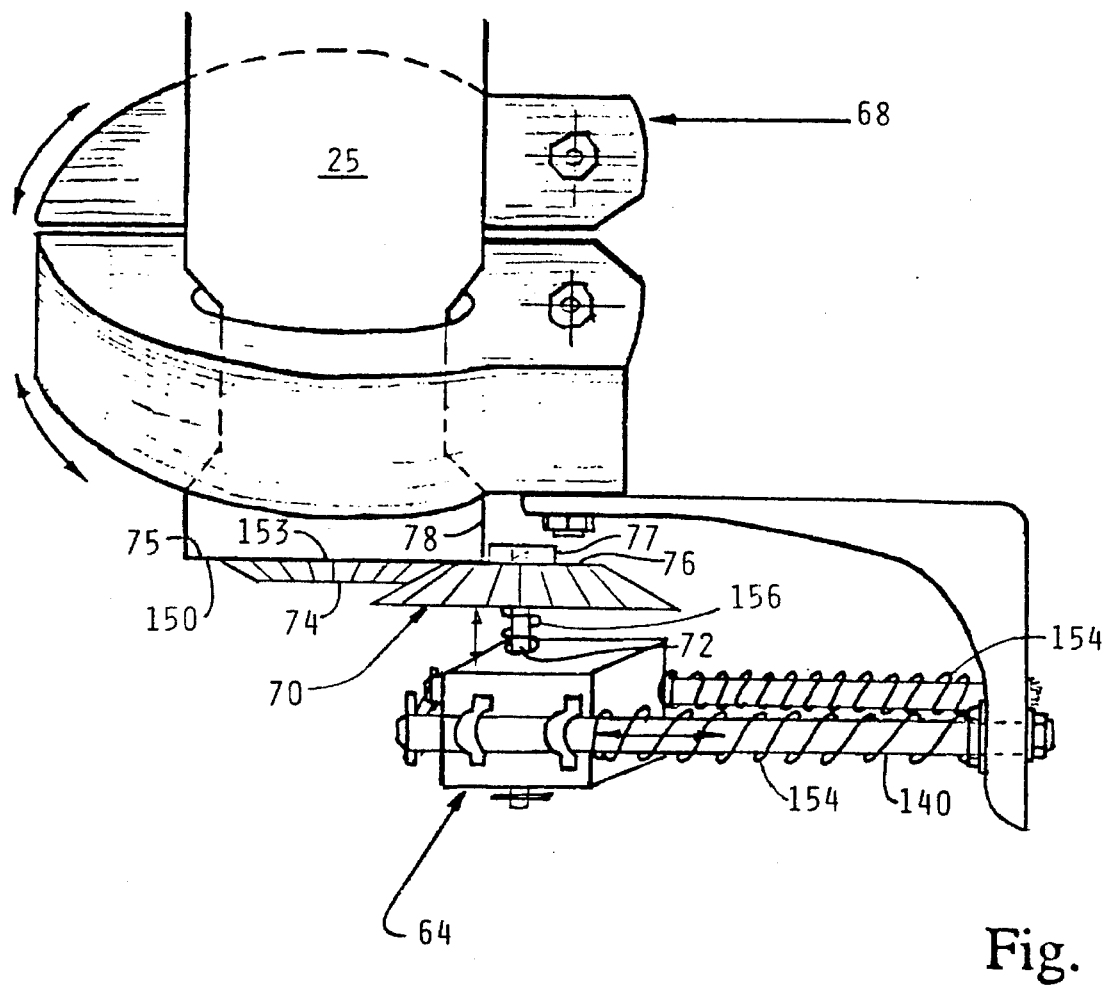
FIG. 8 is a pictorial detail view of the connection of the trailer's kingpin to a receiver body of the tractor, and with monitor components shown in smaller scale, except the bevel gear of the monitor components as shown disproportionally larger.
Figure 9:
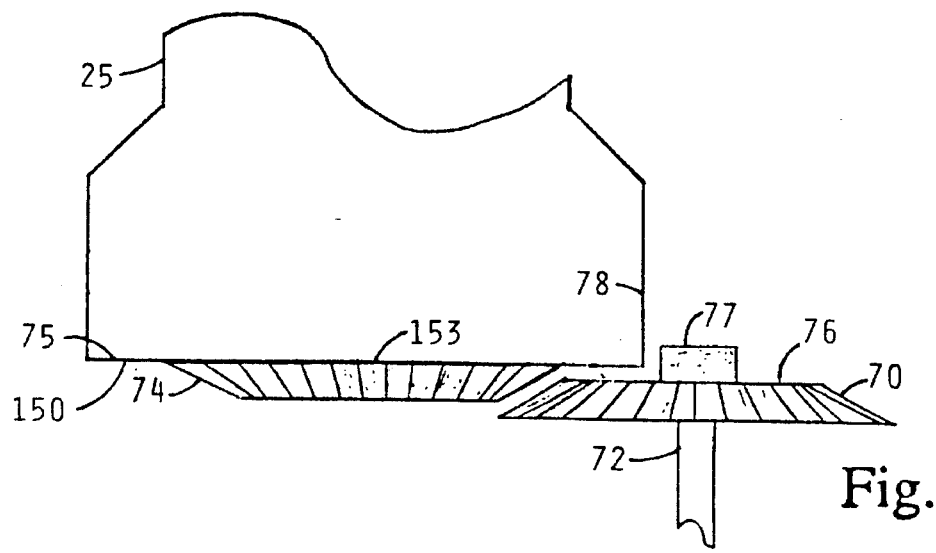
FIG. 9 is a schematic detail of the interconnection of the kingpin's large bevel gear and the monitor components' small bevel gear, it again being shown in disproportionally larger scale.

The forces involved (FIGS. 8 and 9), if not already perceived, are now further detailed, as follows:

The springs 154 On the bracket arms 140 (which support the encoder 64 by the fifth wheel receiver 68) are compression springs, which exert rearward force on the rotary encoder 64, tending to push the encoder 64 and its small gear 70 rearward; and the spring 156 on the encoder 64's shaft 72 pushes the small gear 70 upward.

The force of the forward moving kingpin 25 in contrast tends to push the rotary encoder 64 downward and forward.

These opposing forces keep the small bevel gear 70 and the large bevel gear 74 meshed. Even after the kingpin 25 is not moving with respect to the tractor 22 (after coupling has occurred), the spring-opposing downward and forward forces are maintained due to the bevel cut of the gears 70/74.

If the vertical component of the spring forces is larger than its horizontal component, the bevel gears 70/74 will slide in their mesh, the small rotary encoder gear 70 travelling upward until the horizontal guard zone 150 stops this vertical movement, thus insuring that the gears 70/74 stay meshed. If, however, the horizontal component of the spring forces is larger than its vertical component, the bevel gears 70/74 will slide in their mesh, the small rotary encoder gear 70 travelling downward and rearward until the vertical edge of the collar 77 of the small bevel gear 70 stops against the vertical edge 78 of the kingpin head, thus stopping the motion and insuring that the two gears 70/74 stay meshed, providing more than enough torque to the easy-turning rotary encoder 64 when the semi is making a turn.

Summarization of good operativity:

The rotary encoder 64, which can subdivide a single rotation of its shaft into more than a thousand parts, provides more than enough accuracy for measuring the tractor/trailer angle change "b", the input to the mirror equation.

The stepper motor 60, which is both fast and accurate enough to run the printing heads of most computer printers and plotters, provides plenty of speed and accuracy to respond to the information from the rotary encoder 64 and move the mirror through angle "a", the output of the mirror equation.

The electronic circuit of the control box 62 which receives input pulses from the rotary encoder 64 and translates them into proper drive pulses to the stepper motor 60 typically operates in the microsecond range, thus giving the mirror 28 ample time to follow the relatively slow-changing angle of trailer swing "b".

In summary, only a good quality flat mirror 28 (46/48) can be expected to provide an undistorted view. And, only by following the equation developed for angle "a" or "2a" can the mirror constantly and accurately track the dangerous rear-end 42 of the trailer 24. A mirror 28 which meets the above conditions and is wide enough to compensate for the diminished field of view can offer the semi driver a clear, non-distorted view of the rear of his trailer 24 no matter where he is in his turn, making the difficult job of handling a big rig in an urban area considerably easier and safer.

Summary of components and operational details, and their advantages:

The present invention as detailed herein has advantages in both concept and in component parts and features; for in contrast to other equipment known to the inventor to the prior art cited herein, the invention provides advantageous features which should be considered, both as to their individual benefit, and to whatever may be considered to be also their synergistic benefit toward the invention as a whole:

a. The components of the overall apparatus, once installed, will likely need but little maintenance or adjustment;

b. If the pulling and pulled vehicles are vehicles to be used together for a length of time, during that time no adjustment of mechanism for mirror-rotation would likely be needed; and even if the two mated vehicles are disconnected, no likely adjustment need to be made at the time of their re-connection, except to remove any adjustment which had been made during the interim of their non-connection;

c. Even with a different pulled vehicle, the tractor's components could be provided to be adjusted to satisfactorily cooperate with the vehicle to be pulled;

d. The vehicles could be provided with an apparatus for the present invention, as components of the original equipment or as additions to existing vehicles, with no parts needing to be removed to accommodate the components of the present invention to be installed on existing vehicles, except its rear view mirror;

e. Advantage is taken of the known prior art as to rotation-monitoring apparatus, component rotation, and physics' confidence and knowledge of light travel and reflection travel when viewed through a mirror;

f. Advantage is also taken of the practice and habit of a truck driver in looking through a rear view mirror mounted in the usual location on the side of the truck, and made to be there operable for this invention's newly-achieved "throughout a turn" safety vision, even though that location is significantly offset from both the lateral and longitudinal location of the semi's kingpin which is the only portion of the truck and trailer vehicles which is common to both vehicles, and even though except at the kingpin the two vehicles are differently related at all increments of turns;

g. The components are readily adjustable to account for the most significant parameters of the matter of vision-scope to be centered on the side of the rear of the trailer during a turn, including the factors of "C" which is the distance (fore-and-aft distance) from the mirror to the kingpin, "t" which is the length of the trailer from its kingpin to the trailer's rear end, and "K" which is ½ the width at its rear end;

h. Most of the apparatus, although usable with both both the tractor and the trailer, is advantageously made a part of the tractor, permitting the cost of the apparatus to be used by the semi's tractor rather than sometimes "wasted" on the trailer unit during intervals in which it is not being used as a part of the semi combination;

i. And the rotationally achieved alignment of the truck's mirror, throughout the entire range of relative rotation of the trailer, is so precise that even a reasonable margin of error, of perhaps 4%, is likely to be quite acceptable to the achievement of the desired vision scope including the side of the trailer's rear end; and j. The vision scope is achieved to include the side of the rear of the trailer throughout the turn without the use of components such as convex wide angle mirrors, thus avoiding their disadvantages.

Conclusion:

It is thus seen that an apparatus achieving mirror rotation for the safety viewing of a pulled trailer's side of its rear end throughout a turn maneuver, the apparatus being constructed and used according to the inventive concepts herein set forth, provides novel concepts of a desirable and usefully advantageous device, yielding advantages which are and provide special and particular advantages when used as herein set forth, as to the achievement of this safety-vision matter which had long been a serious and dangerous problem for semis and other vehicles which are tandem-connected at a single pivot point.

In summary as to the nature of the overall device's advantageous concepts, their novelty and inventive nature is shown by novel features of concept and construction shown here in advantageous combination and by the novel concepts hereof not only being different from all the prior art known, even though the problem of vision of the dangerous rear portion of the trailer throughout significant turns of the tractor is a serious danger which has been known for scores of years, but also because the achievement is not what is or has been suggested to those of ordinary skill in the art, especially realistically considering this as a novel combination comprising components and details which individually are similar in nature to what are well known to a great many, surely including most, of the many makers and servicers of rotation-monitoring equipment and other components usable in this combination. No prior art, and no component or element, has even suggested the modifications of any other prior art to achieve the particulars of the novel concepts or the overall combination here achieved, with the special advantages which the overall device provides; and this lack of suggestion by any prior art has been in spite of the long world-wide use of vehicle mirror installations, and in spite of their dangers by not providing safety compatability with the actual and millions of times turns of connected vehicles.

The differences of concept and construction as specified herein yield advantages over the prior art; and the lack of this invention by the prior art, as a prior art combination, has been in spite of this invention's apparent simplicity of the construction once the concepts have been conceived, in spite of the advantages it would have given, and in spite of the availability of all the materials, to all persons of the entire world.

Quite certainly this particular combination of prior art details as here presented in this overall combination has not been suggested by the prior art, this achievement in its particular details and utility being a substantial and advantageous departure from prior art, even though the prior art has had similar components in a separate state for a multiplicity of uses for numbers of years. And particularly is the overall difference from the prior art significant when the non-obviousness is viewed by a consideration of the subject matter of this overall device as a whole, as a combination integrally incorporating features different in their combination from the prior art, in contrast to merely separate details themselves, and further in view of the prior art rear view mirror apparatus not achieving particular and combination advantages of both convenience and safety while avoiding the disadvantages such as described herein as to turn maneuvers of a semi having the dangerous blind range in contrast to merely a blind spot.

Accordingly, it will thus be seen from the foregoing description of the invention according to these illustrative embodiments, considered with the accompanying drawings, that the present invention provides new and useful concepts of a novel and advantageous apparatus, possessing and yielding desired advantages and characteristics in formation and use, and accomplishing the intended objects, including those hereinbefore pointed out and others which are inherent in the invention.

Modifications and variations may be effected without departing from the scope of the novel concepts of the invention; accordingly, the invention is not limited to the specific embodiment, or form or arrangement of parts herein described or shown. Thus, for example, the phrase "kingpin" is intended to mean any type of generally vertical connector member, regardless of whether its free end projects upwardly or downwardly; and since the phrase "rotary encoder" descriptively is used as to electronic apparatus which when rotated generates an electrical signal in proportion to the amount of rotation, the phrase "rotary encoder" is used here in the broad sense of such apparatus as capable of that function.

I claim:

1. A side rear-view mirror system for an interconnected assembly of a pulling vehicle having a cab for the driver's occupancy, and a pulled vehicle;

the system comprising,
in combination:

an outside mirror having a vertical axis of rotation and a base, about which axis the mirror is rotatable, said mirror being mounted on the pulling vehicle;

a stepper motor, an electronic rotary encoder, and an electronic control box; the electronic control box being operatively connected to said rotary encoder to receive electrical signals from the rotary encoder, and correspondingly generating electrical drive pulses to the stepper motor, the rotary encoder having a control shaft, the rotary encoder being operative to generate electrical signals in correspondence to angular movement of the control shaft, a fifth-wheel hitch having components on the pulling vehicle and the pulled vehicle, the component of the fifth-wheel hitch located on the pulled vehicle being a kingpin, the kingpin having a first end which is mounted on the pulled vehicle and a second end which is free, the component of the fifth-wheel hitch located on the pulling vehicle being a kingpin coupler, and a pair of bevel gears, the mirror being electrically rotated by the stepper motor, the stepper motor being located at the base of the mirror, said stepper motor being operatively connected to said electronic control box to receive said electrical drive pulses from the electronic control box, said box being mounted on the pulling vehicle, the electronic control box being operative to receive and interpret electrical signals, such that any relative angular displacement from an in-line tandem position between the pulling vehicle and the pulled vehicle is sensed by said electronic control box, the electrical signals being proportional to the amount of said angular displacement, and are generated by the electronic rotary encoder, the rotary encoder being mounted on the pulling vehicle component of the fifth-wheel hitch, the movement of the shaft of the rotary encoder being coordinated with the angular displacement of the fifth-wheel hitch's kingpin component located on the pulled vehicle, the coordinated angular displacement being accomplished by the pair of bevel gears, one of the bevel gears being mounted on the free end of the kingpin, the other of the bevel gears being mounted on an end of the shaft of the rotary encoder such that operative meshing of these two gears occurs when the pulling vehicle and the pulled vehicle are joined by the fifth-wheel hitch components of the pulling vehicle and of the pulled vehicle, by which any change in the angular displacement between the pulling vehicle and the pulled vehicle, as occurs during a turn of the interconnected assembly, will result in a corresponding turning of the shaft of the rotary encoder, which sends a corresponding electronic signal to the control box which in turn sends a corresponding amount of electrical drive pulses to the stepper motor to rotate the outside mirror;

the mirror providing a view directed toward the side portion of the rear portion of the pulled vehicle, said mirror rotates a significant arc from its original position to follow the relative angular displacement between the two vehicles from a generally in-line tandem position, as the pulled vehicle relatively swings outwardly a significant arc from its original position when following the pulling vehicle in a generally aligned tandem manner;

the pulling vehicle and the pulled vehicle being provided with said fifth-wheel components, which provide a pivotal connection by which the vehicle are pivotally connected in a tandem relation, the pivotal connection being located in a rearward portion of the pulling vehicle and in a forward portion of the pulled vehicle, with the pulling vehicle's outside mirror mounted on the pulling vehicle forwardly of but laterally to the side of said fifth-wheel pivotal connection of the vehicles about one-half the width of the pulled vehicle's rear portion, the system providing a driver with said view directed toward the pulled vehicle's rear-portion of said side portion, while the two vehicles are displaced from a generally in-line tandem position, the system causing the mirror to rotate, from its original position to maintain the view to be along the side of the pulled vehicle, the amount of the mirror's rotation being an angle "a" which is numerically equal to:

$$a = \frac{1}{2} \text{Arctan} \left[ \frac{t \cdot \sin b + k(\cos b - 1)}{t \cdot \cos b - k \cdot \sin b + c} \right]$$

wherein "a" is the angle of the mirror rotation from its original position to direct the view to be along the side of the pulled vehicle, and where "b" is the angle, as sensed by the turning of the shaft of the rotary encoder, which the pulled vehicle has swung from its generally aligned tandem-pulled position directly behind the pulling vehicle, and where "t" is the fore-and-aft distance from the pivotal connection to the rear end of the pulled vehicle;

and where "k" is one-half the width of the rear portion of the pulled vehicle;

and where "C" is the fore-and-aft distance from the center axis of said mirror to the pivotal connection.

* * * * *

UNITED STATES PATENT AND TRADEMARK OFFICE
CERTIFICATE OF CORRECTION

PATENT NO. : 5,541,778

DATED : JUL. 30, 1996

INVENTOR(S) : Ralph E. DeFlorio

It is certified that error appears in the above-indentified patent and that said Letters Patent is hereby corrected as shown below:

Col. 4, line 2; after "advantages" delete the hyphen.

Col. 4, line 16; before "moving" delete the hyphen.

Col. 5, line 23; before "reference" insert a comma.

Col. 5, line 35; change the location of the word "turn" to the right hand end of that line 35.

UNITED STATES PATENT AND TRADEMARK OFFICE
CERTIFICATE OF CORRECTION

PATENT NO. : 5,541,778

DATED : JUL. 30, 1996

INVENTOR(S) : Ralph E. DeFlorio

It is certified that error appears in the above-indentified patent and that said Letters Patent is hereby corrected as shown below:

Col. 8, line 49; Change "DIET" to: -- "DIRECT" --.

Col. 9, line 63; change "off" to: -- of --.

Col. 10, line 39; after "stop" insert: -- 92 and --.

Col. 13, line 34; before "keep" insert: -- monitoring, i.e., --.

UNITED STATES PATENT AND TRADEMARK OFFICE
CERTIFICATE OF CORRECTION

PATENT NO.  : 5,541,778

DATED       : JUL. 30, 1996

INVENTOR(S) : Ralph E. DeFlorio

It is certified that error appears in the above-indentified patent and that said Letters Patent is hereby corrected as shown below:

Col. 18, line 62; change
"vehicle" to -- vehicles --.

Col. 20, line 12; change
"C" to: -- "c" --.

Signed and Sealed this

Eleventh Day of March, 1997

Attest:

BRUCE LEHMAN

Attesting Officer

Commissioner of Patents and Trademarks